United States Patent
Lindblad et al.

(10) Patent No.: US 9,664,284 B2
(45) Date of Patent: May 30, 2017

(54) COVER SYSTEM WITH GASKET SYSTEM THEREFOR

(71) Applicant: General Electric Company, Schenectady, NY (US)

(72) Inventors: Amy Ann Lindblad, Milwaukee, WI (US); Julian Richard Knudsen, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 29 days.

(21) Appl. No.: 14/818,599

(22) Filed: Aug. 5, 2015

(65) Prior Publication Data
US 2017/0037969 A1 Feb. 9, 2017

(51) Int. Cl.
*F16J 15/06* (2006.01)
*F16J 15/02* (2006.01)
*F16J 15/10* (2006.01)

(52) U.S. Cl.
CPC ......... *F16J 15/061* (2013.01); *F16J 15/021* (2013.01); *F16J 15/104* (2013.01)

(58) Field of Classification Search
CPC ................... F16J 15/0818–15/0893
USPC ................................. 277/592–598
See application file for complete search history.

(56) References Cited

U.S. PATENT DOCUMENTS

| | | | | |
|---|---|---|---|---|
| 3,352,564 A | * | 11/1967 | Johnson | F16J 15/123 277/593 |
| 3,656,769 A | * | 4/1972 | Jelinek | F16L 23/20 277/611 |
| 4,088,347 A | * | 5/1978 | Bruggemann | F01N 13/1805 277/598 |
| 4,964,293 A | * | 10/1990 | Inoue | C21D 7/02 277/592 |
| 5,427,389 A | * | 6/1995 | Ishikawa | F02F 11/002 277/595 |
| 5,472,217 A | * | 12/1995 | Hagiwara | F16J 15/0825 277/596 |
| 5,685,547 A | * | 11/1997 | Jargeaix | F16J 15/064 277/598 |
| 5,700,017 A | * | 12/1997 | Tensor | F16J 15/123 277/596 |
| 5,938,208 A | * | 8/1999 | Yoshida | F16J 15/0818 277/592 |
| 5,951,021 A | * | 9/1999 | Ueta | F16J 15/0818 277/593 |
| 6,460,859 B1 | * | 10/2002 | Hammi | F16J 15/122 277/596 |

(Continued)

*Primary Examiner* — Justin Rephann
(74) *Attorney, Agent, or Firm* — Ernest G. Cusick; Hoffman Warnick LLC

(57) ABSTRACT

A gasket system for sealing a cover about an opening having a gasket seat thereabout is provided. The gasket seat has a number of fastener receiving elements that is greater than a number of fasteners used with the cover. The gasket may include a body having a shape configured to mate with a sealing surface of at least one of the gasket seat and the cover, the body having an open center. The gasket may also include a fastener receiving opening in the body for each of the first number of fastener receiving elements in the gasket seat, and a raised rib extending from a surface of the body adjacent to at least one of the third number of fastener-free receiving elements in the gasket seat.

19 Claims, 6 Drawing Sheets

(56) References Cited

U.S. PATENT DOCUMENTS

| | | | | |
|---|---|---|---|---|
| 6,502,830 B2* | 1/2003 | Teranishi | F16J 15/0818 | 277/591 |
| 6,508,471 B1* | 1/2003 | Blau | F16J 15/064 | 277/313 |
| 6,575,473 B2* | 6/2003 | Hiramatsu | F16J 15/0818 | 277/592 |
| 6,779,800 B2* | 8/2004 | Udagawa | F16J 15/0818 | 277/592 |
| 7,004,472 B2* | 2/2006 | Diez | G01L 23/10 | 277/318 |
| 7,147,231 B2* | 12/2006 | Koch | F16J 15/127 | 277/592 |
| 7,255,069 B2* | 8/2007 | Liebert | F02F 1/102 | 123/193.5 |
| 8,109,520 B2* | 2/2012 | Imai | F16J 15/0818 | 277/593 |
| 2002/0027327 A1* | 3/2002 | Sugimoto | F16J 15/0818 | 277/592 |
| 2004/0051253 A1* | 3/2004 | Clemons | B25B 31/005 | 277/598 |
| 2005/0140096 A1* | 6/2005 | Golombek | F16J 15/0825 | 277/594 |
| 2005/0269788 A1* | 12/2005 | Grunfeld | F02F 11/002 | 277/592 |
| 2005/0269790 A1* | 12/2005 | Diez | F16J 15/0818 | 277/594 |
| 2005/0280214 A1* | 12/2005 | Richards | F16J 15/122 | 277/608 |
| 2007/0200301 A1* | 8/2007 | Novil | F16J 15/0818 | 277/596 |
| 2007/0210532 A1* | 9/2007 | Hegmann | F02F 11/002 | 277/593 |
| 2008/0246232 A1* | 10/2008 | Takahashi | F16J 15/122 | 277/651 |
| 2009/0045590 A1* | 2/2009 | Ueta | F16J 15/0818 | 277/595 |
| 2009/0102137 A1* | 4/2009 | Katayama | F16J 15/061 | 277/594 |
| 2010/0164185 A1* | 7/2010 | Unseld | F16J 15/0818 | 277/596 |
| 2011/0139113 A1* | 6/2011 | Miller | F02F 1/16 | 123/193.3 |

* cited by examiner

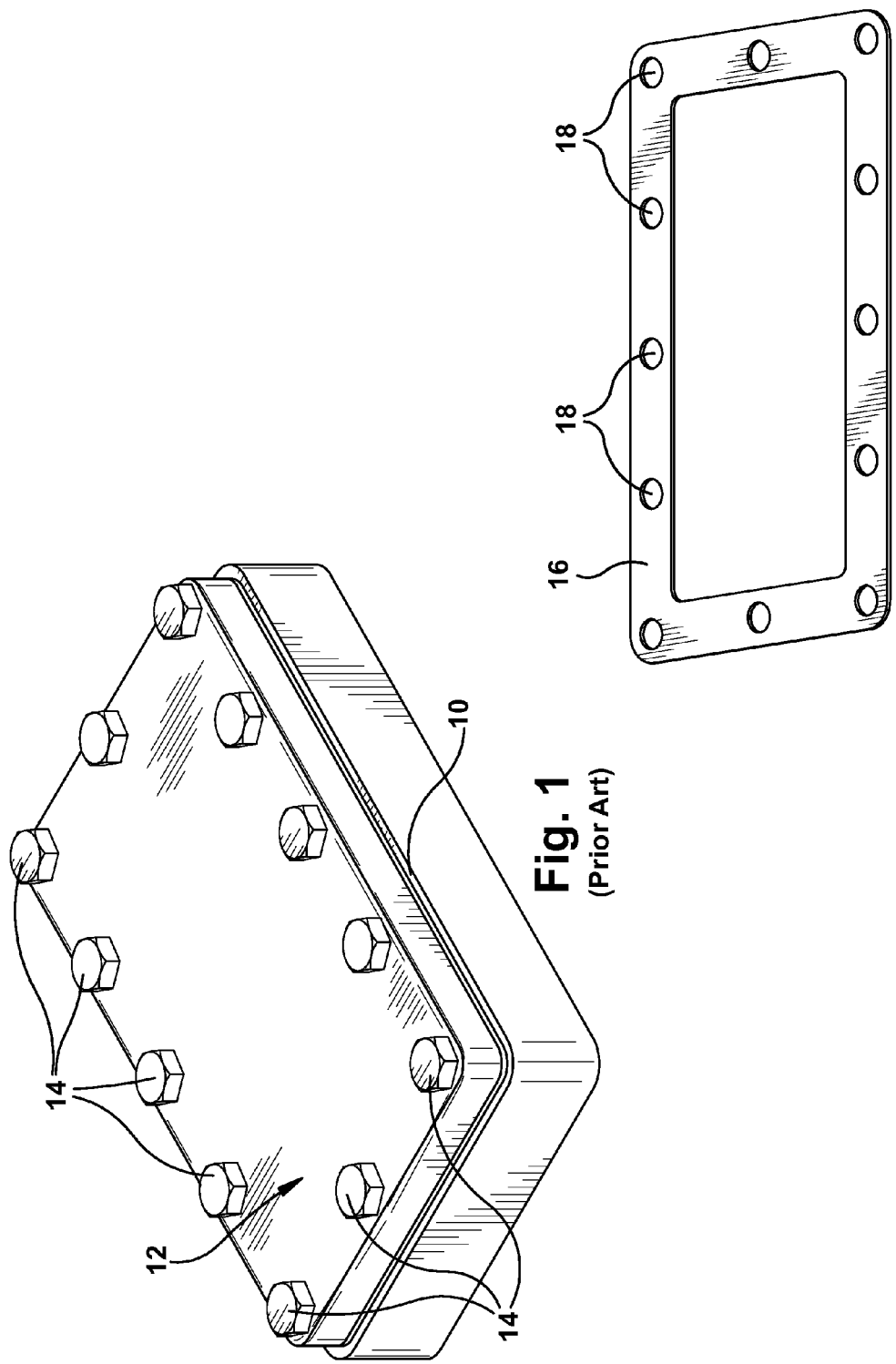

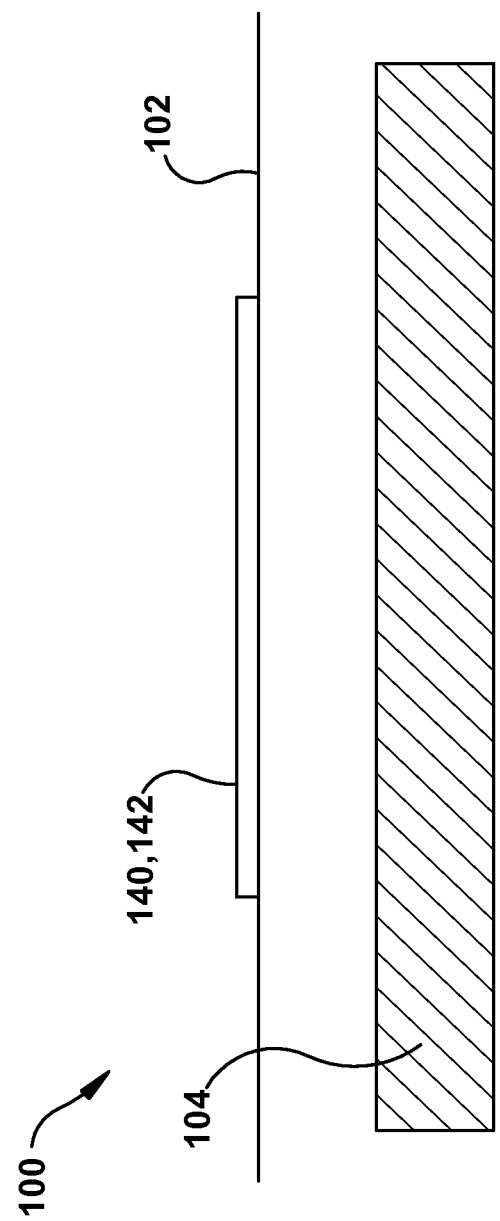

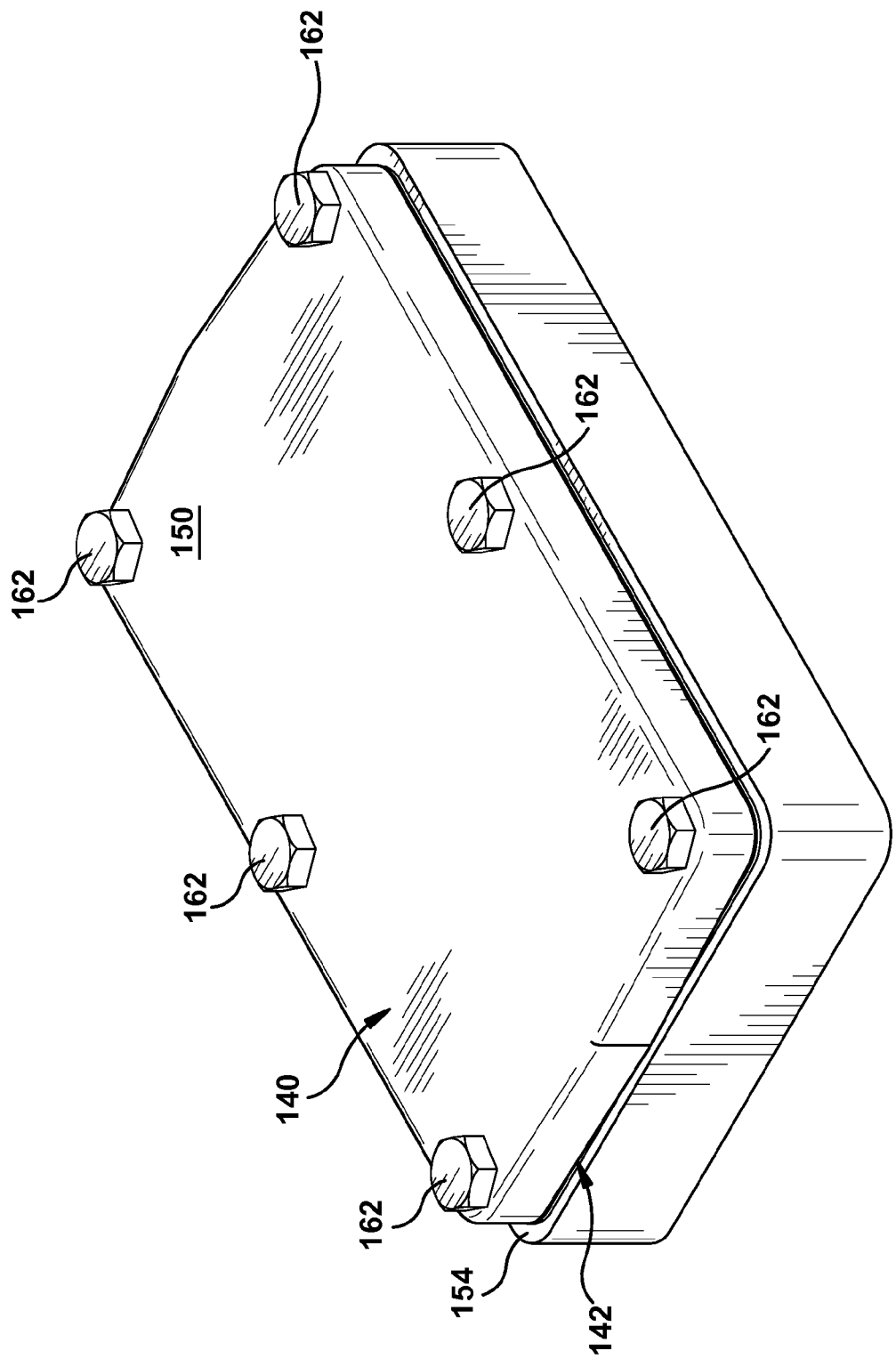

COVER SYSTEM WITH GASKET SYSTEM THEREFOR

BACKGROUND OF THE INVENTION

The disclosure relates generally to sealing technology, and more particularly, to a cover system and gasket system therefor for sealing a cover about an opening having a gasket seat having a greater number of fastener receiving elements than a number of fasteners used with the cover.

Industrial machines such as engines may include a number of inspection covers that can be removed during periodic repairs to inspect an inner part of the machines through an inspection opening sealed by the cover. The environments within these industrial machines can be extreme and require precise sealing of the covers to a gasket seat about the inspection openings. One conventional inspection cover system is shown in FIG. 1. This example includes a gasket seat 10 in a body of an industrial machine (not shown) that includes a cover 12 having twelve (12) fasteners 14 for holding the cover to the gasket seat. A gasket 16, shown in FIG. 2, is used with cover 12 and includes twelve (12) openings 18, one for each fastener 14. One challenge with cover systems as illustrated in FIGS. 1 and 2 is that the large number of fasteners used increases the time required to remove and replace the covers during inspection of the machine.

BRIEF DESCRIPTION OF THE INVENTION

A first aspect of the disclosure provides a gasket system for sealing a cover about an opening having a gasket seat thereabout, the gasket seat having a first number of fastener receiving elements that is greater than a second number of fasteners used with the cover, resulting in a third number of fastener-free receiving elements in the gasket seat, the gasket comprising: a body having a shape configured to mate with a sealing surface of at least one of the gasket seat and the cover, the body having an open center; a fastener receiving opening in the body for each of the first number of fastener receiving elements in the gasket seat; and a raised rib extending from a surface of the body adjacent to at least one of the third number of fastener-free receiving elements in the gasket seat.

A second aspect of the disclosure provides a cover system for sealing a cover about an opening having a gasket seat thereabout, the gasket seat having a first number of fastener receiving elements that is greater than a second number of fasteners used with the cover, resulting in a third number of fastener-free receiving elements in the gasket seat, the cover system comprising: a body having a shape configured to mate with a sealing surface of at least one of the gasket seat and the cover, the body having an open center; a fastener receiving opening in the body for each of the first number of fastener receiving elements in the gasket seat; a raised rib extending from a surface of the body adjacent to at least one of the third number of fastener-free receiving elements in the gasket seat; and wherein the cover has a shaped configured to seal with the gasket.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 shows a perspective view of a conventional cover system.

FIG. 2 shows a perspective view of a conventional gasket.

FIG. 3 shows a schematic side view of an illustrative industrial machine employing a cover system and gasket system according to embodiments of the disclosure.

FIG. 4 shows a perspective view of a cover system and a gasket system therefor according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 5:
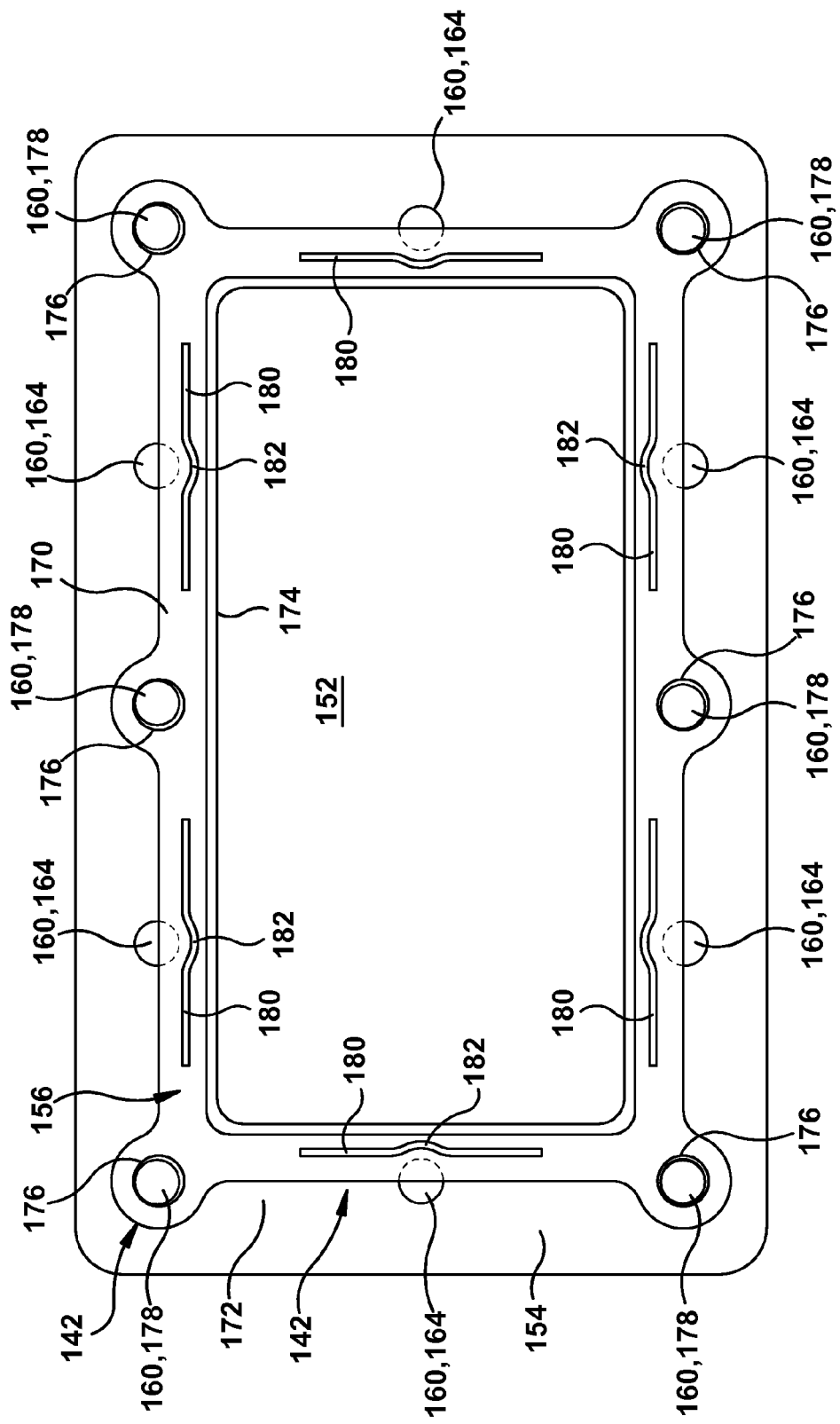
FIG. 5 shows a plan view of one embodiment of a gasket according to embodiments of the disclosure.

As indicated above, the disclosure provides a cover system and gasket system therefor sealing a cover about an opening having a gasket seat having a greater number of fastener receiving elements than a number of fasteners used with the cover.

FIG. 3 shows schematic side view of an illustrative industrial machine 100 in the form of a engine casing enclosing a crankshaft. While the teachings of the invention will be described relative to machine 100, it is emphasized that the disclosure can be applied to a wide variety of industrial machines. In this example, machine 100 includes a crankshaft casing 102 enclosing a crankshaft 104 operatively coupled to an engine (not shown). In accordance with an exemplary embodiment, a cover system 140 including a gasket system 142 may be positioned to inspect a portion of, for example, crankshaft 104. Although systems 140, 142 are shown provided in a particular location, it is understood that the system can be employed practically anywhere on machine 100 or another industrial machine requiring occasional inspection of an internal, sealed chamber.

FIG. 4 shows a perspective view of cover system 140 including gasket system 142, and FIG. 5 shows a plan view of gasket system 142 (cover removed). As will be described herein, cover system 140 and gasket system 142 seal a cover 150 (FIG. 4) about an opening 152 (FIG. 5) having a gasket seat 154 (FIG. 5) thereabout for receiving a gasket 156. Gasket seat 154 may take any variety of shapes configured to accommodate gasket 156, as will be described. In FIG. 4, gasket seat 154 is illustrated as having a substantially identical shape as cover 150; however, in FIG. 5, gasket seat 154 is shown more rectangular and not identical to the removed cover. Gasket seat 154 may be an integral part of the industrial machine in which it is provided, e.g., a casing of machine 100 (FIG. 3).

Figure 6:
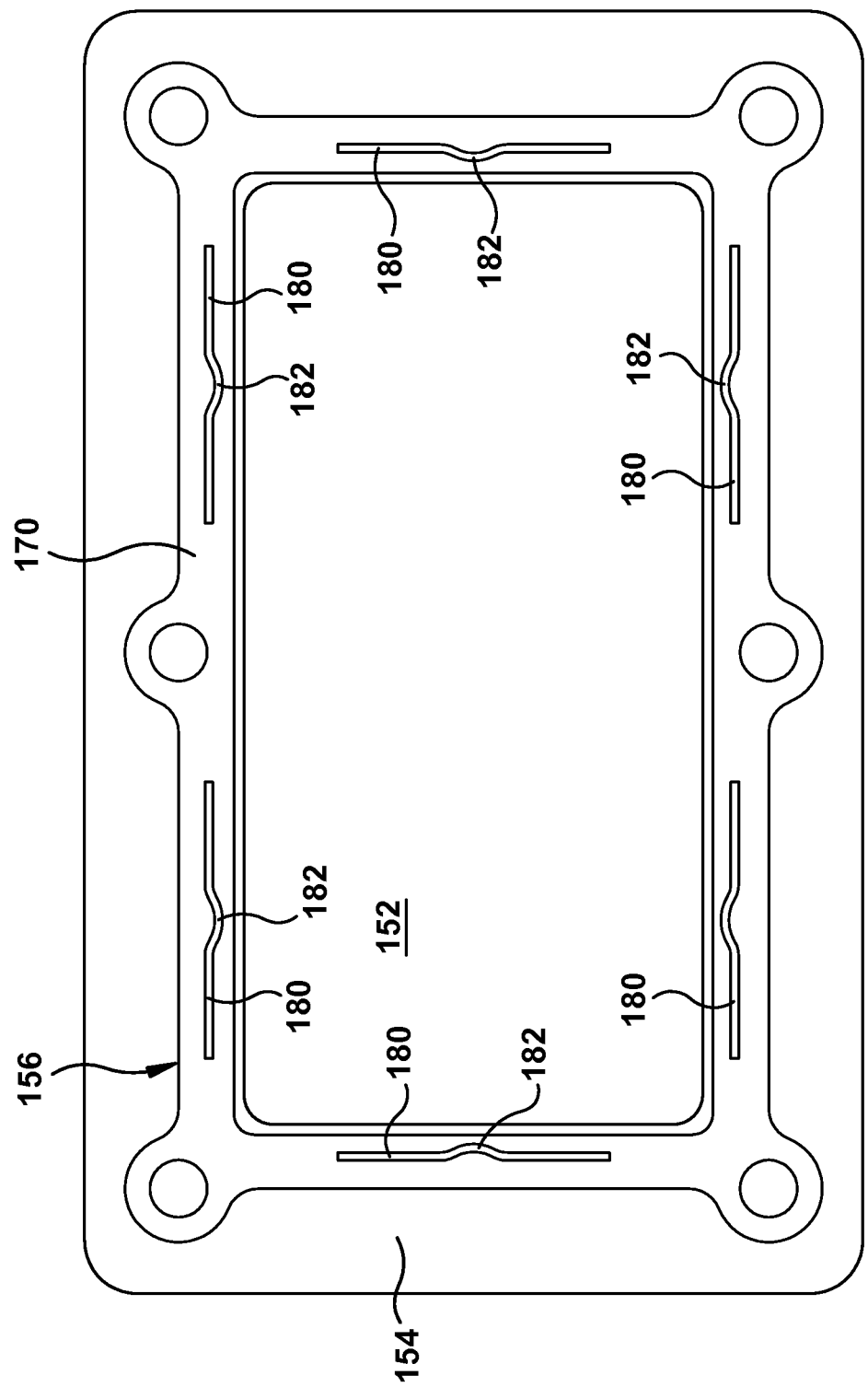
FIG. 6 shows a plan view of the gasket used with another cover arrangement according to embodiments of the disclosure.

Cover 150 is configured to mount to gasket seat 154 using a number of fasteners 162 (FIG. 4). In one embodiment, shown in FIG. 5, the number of fasteners 162 may be less than what gasket seat 154 was originally configured to receive. Consequently, as observed by comparing FIGS. 4 and 5, gasket seat 154 (FIG. 5) includes a first number of (would-be) fastener receiving elements 160 that is greater than a second number of fasteners 162 (FIG. 4) used with cover 150. In other words, gasket seat 154 (FIG. 5) includes would-be, fastener receiving element 160 for fasteners 14 (FIG. 1) provided with an original cover 12 (FIG. 1) having the same number of openings therein. Consequently, a third number of fastener-free receiving elements 164 are provided in gasket seat 154, i.e., when cover 150 is mounted, that do not receive a fastener. Alternatively, as shown in FIG. 6, systems 140, 142 and, in particular, gasket 156 as described herein may also be employed where the number of fasteners 162 in a newly designed cover 150 matches what gasket seat 154 was originally configured to receive. In FIG. 6, there are 6 holes in cover 150, gasket seat 154 and gasket 156, although gasket 156 is identical to that shown in FIG. 5. Fastener receiving elements 160 and fastener-free receiving elements 164 may include any now known or later developed fastener receiving structure such as but not limited to a threaded opening for threadably receiving a bolt. While cover 150 has been illustrated in a particular manner in FIG. 4, it is emphasized that cover 150 may omit that structure and take a variety of other forms such as but not limited to a solid plate with a window.

In order to seal opening 152, gasket 156 of gasket system 142 includes, according to embodiments of the disclosure, a body 170 having a shape configured to mate with a sealing surface 172 of gasket seat 154 and/or a sealing surface (not numbered) of cover 150. As will be understood, the sealing surfaces may include a conventional polished surface capable of sealing with gasket 156. Each sealing surface may include all or part of gasket seat 154 and/or cover 150. Body 170 includes an open center 174, which may substantially match that of opening 152 in gasket seat 154. Gasket 156 also includes a fastener receiving opening 176 in body 170 for each fastener 162 (FIG. 4) used with cover 150 (FIG. 4). Each fastener receiving opening 176 aligns with a corresponding fastener receiving element 178 in gasket seat 154 that will be used with cover 150 (FIG. 4). Fastener receiving openings 176 may be provided in body 170 in any fashion. As illustrated, each opening 176 is provided in a tab or protrusion of body 170; however, alternative arrangements may be possible.

Gasket 156 may also include a raised rib 180 extending from a surface of body 170 adjacent to, where present, at least one of fastener-free receiving elements 164 in gasket seat 154. Although shown as though a raised rib 180 is adjacent each element 164, that may not be necessary in all instances. Each raised rib 180 may be formed integrally with body 170. In one example operation for a retrofit situation, as illustrated in FIGS. 4 and 5, gasket 156 is positioned over gasket seat 154 with openings 176 in gasket 156 aligned with fastener receiving elements 178 in gasket seat 154. Cover 150 is then aligned with gasket 156 and fasteners 162 are used to mount the cover, e.g., by threadably coupling fasteners 162 into fastener receiving elements 178. As cover 150 is mounted, gasket 156 is compressed to seal opening 152 and raised ribs 180 are compressed to seal fastener-free receiving elements 164. While raised ribs 180 are illustrated as facing cover 150, in alternative embodiments, they may face gasket seat 154. As illustrated for another example in FIGS. 4 and 6, a newer cover design may employ a gasket 156 positioned over gasket seat 154 with openings 176 in gasket 156 aligned with a matching number of fastener receiving elements 178 in gasket seat 154. Cover 150 is then aligned with gasket 156 and fasteners 162 are used to mount the cover, e.g., by threadably coupling fasteners 162 into fastener receiving elements 178. As cover 150 is mounted, gasket 156 is compressed to seal opening 152 and raised ribs 180, if present, are compressed (despite no fastener-free receiving elements 164 being present). While raised ribs 180 are illustrated as facing cover 150, in alternative embodiments, they may face gasket seat 154.

Figure 7:
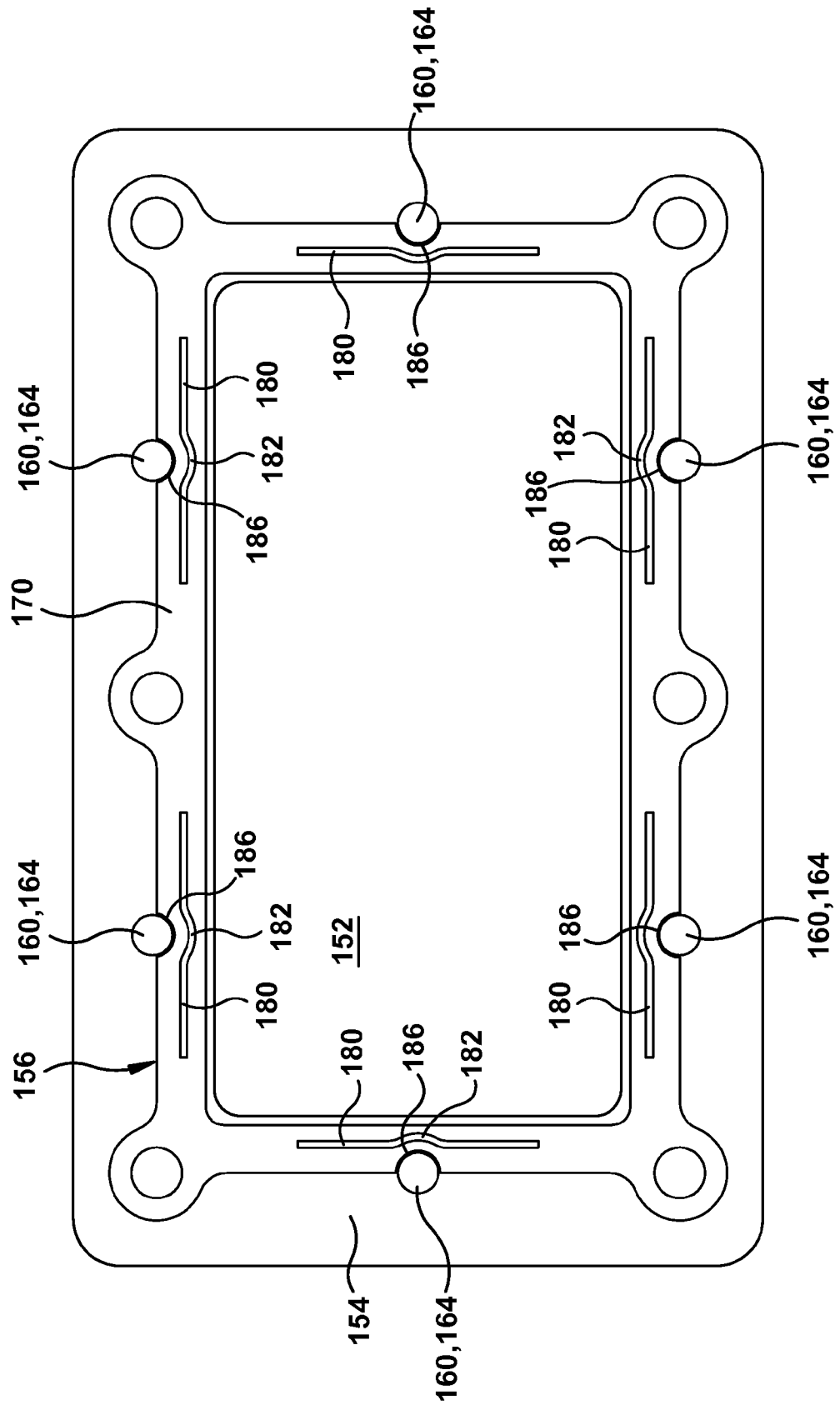
FIG. 7 shows a plan view of an alternative embodiment of a gasket according to embodiments of the disclosure.

Gasket 156 and raised ribs 180 may take a variety of forms to accommodate sealing of fastener-free receiving elements 164. In one embodiment, shown in FIG. 5, at least one raised rib 180 may be linearly contoured 182 to accommodate a corresponding one of fastener-free receiving elements 164 in gasket seat 154. In FIG. 5, body 170 may overlap fastener-free receiving elements 164. In contrast, in an alternative embodiment shown in FIG. 7, a contour 186 may be provided in body 170 adjacent to and accommodating each fastener-free receiving elements 164. "Contours" 186 may include any form of opening in body 170 exposing elements 164. In this case, at least one raised rib 180 may be linearly contoured 182 to accommodate (e.g., curvilinearly match) a respective contour 186.

In the retrofit example illustrated in FIG. 5, the first number of fastener receiving elements 160 is 12, the second number of fasteners 162 (FIG. 4) used with cover 150 (FIG. 4) and hence the number of fastener receiving openings 176 (FIG. 5) in gasket 156 is less, i.e., 6, and the third number of fastener-free receiving elements 164 (FIG. 5) in gasket seat 154 is 6. It is emphasized, however, that a wide variety of other arrangements may be possible where more or less number of openings, elements and fasteners are employed. Also, in the illustrative embodiments, gasket 156 has a shape that is substantially rectangular and includes: a corner fastener receiving opening 176 in each corner of the rectangle and a long-side fastener receiving opening 176 positioned within opposing long sides of the rectangle. A contour 182 may be provided adjacent fastener-free receiving element 164 between each pair of fastener receiving openings 178. As explained herein, other configurations may also be possible.

Gasket 156 may be made of any now known or later developed gasket material appropriate for the industrial machine setting in which it is employed. In the engine example illustrated, gasket 156 and raised ribs 180 may be made of, for example, TS9300 model Thermo-Tork® brand gasket material available from Grand Haven Gasket Company. In an alternative embodiment, gasket 156 may made of the aforementioned gasket material and raised ribs 180 made of a screen printable silicone such as Elastosil® brand silicone available from Wacker Silicones®. In addition, gasket 156 may include a non-stick coating thereon such as but not limited to polytetrafluoroethylene (PTFE) or other non-stick coating.

Cover system 140 with gasket system 142, in a retrofit situation, allow for reduction in the number of fasteners employed to mount a new cover to an inspection opening of an industrial machine having a gasket seat having more openings than the cover and can also be used for newer cover designs that have matching numbers of fasteners in the cover and gasket seat. That is, gasket 156 can be used where a cover 150 with a lower number of fasteners 162 is being retrofitted to a gasket seat 154 having a higher number of fastener receiving elements 164 in gasket seat 154, and gasket 156 can also be used with newer cover 150 that uses the same number of fasteners 162 as fastener receiving elements 164 in gasket seat 154. In any event, systems 140, 142 save assembly and/or service time for the industrial machines while providing the same sealing pressure regardless of whether used as retrofit or as a new system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended t include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A gasket system for sealing a cover about an opening having a gasket seat thereabout, the gasket seat having a first number of fastener receiving elements intended to receive a fastener that is greater than a second number of fasteners used with the cover, resulting in a third number of fastener-free receiving elements in the gasket seat, the gasket comprising:
   a body having a first shape configured to mate with a sealing surface of at least one of the gasket seat and the cover, the body having an open center;
   a fastener receiving opening in the body for each of the second number of fasteners used with the cover; and
   a raised rib extending from a surface of the body adjacent to at least one of the third number of fastener-free receiving elements in the gasket seat.

2. The cover system of claim 1, further comprising a contour in the body adjacent to and accommodating each of the third number of fastener-free receiving elements.

3. The cover system of claim 2, wherein the at least one raised rib is linearly contoured to accommodate the respective contour of the at least one of the third number of fastener-free receiving elements.

4. The cover system of claim 2, wherein the first shape of the body of the gasket is substantially rectangular and includes:
   a corner fastener receiving opening in each corner of the rectangle and a long-side fastener receiving opening positioned within opposing long sides of the rectangle; and
   a contour adjacent at least one of the third number of fastener-free receiving elements between adjacent fastener receiving openings.

5. The cover system of claim 1, wherein the gasket includes a non-stick coating thereon.

6. The cover system of claim 1, wherein the raised rib further extends about an entirety of the open center of the gasket.

7. The cover system of claim 1, wherein the at least one raised rib is linearly contoured to accommodate a corresponding one of the third number of fastener-free receiving elements in the gasket seat.

8. The cover system of claim 1, wherein the first number of fastener receiving elements is 12, the second number of fasteners used with the cover is 6, and the third number of fastener-free receiving elements in the gasket seat is 6.

9. The cover system of claim 1, further comprising the cover having a second shape configured to seal with the gasket.

10. A cover system for sealing a cover about an opening having a gasket seat thereabout, the gasket seat having a first number of fastener receiving elements intended to receive a fastener that is greater than a second number of fasteners used with the cover, resulting in a third number of fastener-free receiving elements in the gasket seat, the cover system comprising:
    a body having a first shape configured to mate with a sealing surface of at least one of the gasket seat and the cover, the body having an open center;
    a fastener receiving opening in a tab protruding outwardly from the body for each of the second number of fasteners used with the cover; and,
    a raised rib extending from a surface of the body adjacent to at least one of the third number of fastener-free receiving elements in the gasket seat.

11. The cover system of claim 10, further comprising a contour in the body adjacent to and accommodating each of the third number of fastener-free receiving elements.

12. The cover system of claim 11, wherein the at least one raised rib is linearly contoured to accommodate the respective contour of the at least one of the third number of fastener-free receiver elements.

13. The cover system of claim 11, wherein the first shape of the body of the gasket is substantially rectangular and includes:
    a corner fastener receiving opening in each corner of the rectangle and a long-side fastener receiving opening positioned within opposing long sides of the rectangle; and
    a contour adjacent at least one of the third number of fastener-free receiving elements between adjacent fastener receiving openings.

14. The cover system of claim 10, wherein the gasket includes a non-stick coating thereon.

15. The cover system of claim 10, wherein the raised rib further extends about an entirety of the open center of the gasket.

16. The cover system of claim 10, wherein the at least one raised rib is linearly contoured to accommodate a corresponding one of the third number of fastener-free receiving elements in the gasket seat.

17. The cover system of claim 10, wherein the first number of fastener receiving elements is 12, the second number of fasteners used with the cover is 6, and the third number of fastener-free receiving elements in the gasket seat is 6.

18. A gasket system for sealing a cover about an opening having a gasket seat thereabout, the gasket seat having a first number of fastener receiving elements intended to receive a fastener that is greater than a second number of fasteners used with the cover, resulting in a third number of fastener-free receiving elements in the gasket seat, the gasket comprising:

a body having a first shape configured to mate with a sealing surface of at least one of the gasket seat and the cover, the body having an open center;

a fastener receiving opening in the body for each of the second number of fasteners used with the cover; and a raised rib extending from a surface of the body adjacent to at least one of the third number of fastener-free receiving elements in the gasket seat, the raised rib having an open shape.

19. The gasket system of claim 18, wherein the body has a tab protruding outwardly, and the fastener receiving opening is in the tab protruding outwardly.

\* \* \* \* \*